United States Patent
Dong

(10) Patent No.: US 12,294,459 B2
(45) Date of Patent: May 6, 2025

(54) RETRANSMISSION FEEDBACK WITH HARQ IN Wi-Fi

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 715 days.

(21) Appl. No.: 17/588,889

(22) Filed: Jan. 31, 2022

(65) Prior Publication Data

US 2022/0158764 A1 May 19, 2022

Related U.S. Application Data

(63) Continuation of application No. PCT/CN2019/098753, filed on Jul. 31, 2019.

(51) Int. Cl.
*H04L 1/08* (2006.01)
*H04L 5/00* (2006.01)

(52) U.S. Cl.
CPC .............. *H04L 1/08* (2013.01); *H04L 5/0023* (2013.01); *H04L 5/0044* (2013.01); *H04L 5/0078* (2013.01); *H04L 5/0092* (2013.01)

(58) Field of Classification Search
CPC ....... H04L 1/08; H04L 5/0023; H04L 5/0044; H04L 5/0078; H04L 5/0092; H04L 1/1685; H04L 1/1825; H04L 1/1854; H04L 5/0055; H04L 1/1614; H04L 5/0091; H04W 72/04
See application file for complete search history.

(56) References Cited

U.S. PATENT DOCUMENTS

| | | | |
|---|---|---|---|
| 8,627,074 B1 | 1/2014 | Goel et al. | |
| 9,887,821 B2 | 2/2018 | Seok | |
| 10,057,747 B2 | 8/2018 | Alpert et al. | |
| 2013/0051266 A1* | 2/2013 | Kim | H04L 1/1893 370/252 |
| 2014/0086168 A1* | 3/2014 | Bao | H04L 5/0053 370/329 |
| 2015/0085777 A1 | 3/2015 | Seok | |

(Continued)

FOREIGN PATENT DOCUMENTS

| | | |
|---|---|---|
| CN | 104350799 A | 2/2015 |
| CN | 106131964 A | 11/2016 |
| CN | 106506125 A | 3/2017 |

OTHER PUBLICATIONS

State Intellectual Property Office of the People's Republic of China, Office Action and Search Report Issued in Application No. 201980001604.9, Aug. 4, 2022, 13 pages.

(Continued)

*Primary Examiner* — Ian N Moore
*Assistant Examiner* — Latresa A McCallum
(74) *Attorney, Agent, or Firm* — Volpe Koenig

(57) ABSTRACT

Methods for retransmission feedback are described. A request frame for establishing a retransmission feedback mechanism is generated and sent. A response frame returned based on the request frame and for establishing the retransmission feedback is received. Wherein the response frame includes first configuration information for performing retransmission feedback.

15 Claims, 6 Drawing Sheets

(56) References Cited

U.S. PATENT DOCUMENTS

| | | | |
|---|---|---|---|
| 2016/0014595 A1* | 1/2016 | Wong | H04W 84/12 |
| | | | 370/338 |
| 2016/0269166 A1* | 9/2016 | Yang | H04W 74/08 |
| 2017/0127440 A1* | 5/2017 | Chun | H04W 56/005 |
| 2017/0230149 A1* | 8/2017 | Wang | H04L 1/1819 |
| 2017/0257863 A1* | 9/2017 | Ko | H04W 24/02 |
| 2017/0311310 A1 | 10/2017 | Ryu et al. | |
| 2018/0123673 A1* | 5/2018 | Kim | H04B 7/0695 |
| 2018/0359807 A1* | 12/2018 | Kim | H04W 72/0446 |
| 2020/0092692 A1* | 3/2020 | Wang | H04W 76/14 |
| 2021/0306089 A1* | 9/2021 | Fehrenbach | H04L 5/0057 |

OTHER PUBLICATIONS

ISA State Intellectual Property Office of the People's Republic of China, Written Opinion of the International Searching Authority Issued in Application No. PCT/CN2019/098753, Apr. 17, 2020, WIPO, 7 pages.

ISA State Intellectual Property Office of the People's Republic of China, International Search Report Issued in Application No. PCT/CN2019/098753, Apr. 17, 2020, WIPO, 4 pages.

\* cited by examiner

RETRANSMISSION FEEDBACK WITH HARQ IN Wi-Fi

CROSS-REFERENCE TO RELATED APPLICATION

The present disclosure is a continuation of International Application No. PCT/CN2019/098753 filed on Jul. 31, 2019, which is incorporated herein by reference in its entirety.

TECHNICAL FIELD

The present disclosure relates to the field of wireless communication technologies but not limited to the field of wireless communication technologies, and particularly relates to data transmission methods and apparatuses.

BACKGROUND

Institute of Electrical and Electronics Engineers established a Study Group (SG) to carry out research on next generation mainstream Wi-Fi technology, covering Wi-Fi transmission of 320 MHz bandwidth and aggregation and collaboration technologies adopting multiple frequency bands and the like, with the vision of increasing rate and throughput by at least four folds compared to the existing 802.11ax. The major application scenarios of the new technology include video transmission, augmented reality (AR) and virtual reality (VR) and the like.

SUMMARY

In view of this, embodiments of the present disclosure provide data transmission methods and apparatuses.

According to a first aspect of embodiments of the present disclosure, there is provided a data transmission method performed by a request end. The method includes generating a request frame for establishing a retransmission feedback mechanism; sending the request frame; and receiving a response frame returned based on the request frame and for establishing the retransmission feedback, where the response frame includes first configuration information for performing retransmission feedback.

In an embodiment, the first configuration information includes at least one of: feedback manner information of the retransmission feedback, where the feedback manner information is used to indicate reception feedback based on data frame or reception feedback based on data block; resource information of the retransmission feedback, where the resource information includes at least one of time information and frequency band information; and trigger frame information for triggering the retransmission feedback, where the trigger frame information at least includes at least one of transmission manner and transmission time information of a trigger frame.

In an embodiment, the request frame includes second configuration information for requesting data frame transmission.

In an embodiment, the second configuration information includes at least one of: first type information of a data frame, where the first type information is used to indicate that the data frame is a single data frame or a continuous data frame; one or more pieces of first frequency band information of the data frame; and first beam information of the data frame, when the first type information indicates a continuous data frame, the second configuration information further includes first quantity information of sub-data frames included in the continuous data frame.

In an embodiment, the response frame further includes third configuration information generated based on the second configuration information, where the third configuration information includes at least one of: second type information of the data frame, where the second type information is used to indicate the data frame is a single data frame or a continuous data frame; second frequency band information of the data frame; and second beam information of the data frame, the method further includes sending the data frame according to the third configuration information.

In an embodiment, sending the data frame according to the third configuration information includes: sending the data frame on a frequency band resource indicated by the second frequency band information.

In an embodiment, when the second type information indicates that the data frame is a continuous data frame, the third configuration information further includes second quantity information of sub-data frames included in the continuous data frame; the second quantity information is determined according to a number of sub-data frames included in the continuous data frame which is requested by the request frame; sending the data frame according to the third configuration information includes: sending sub-data frames of a quantity indicated by the second quantity information.

In an embodiment, sending the data frame according to the third configuration information includes: sending the data frame with a beam indicated by the second beam information.

In an embodiment, the request frame further includes a first duration information bit used to indicate a duration in which the request end occupies a channel; the duration in which the request end occupies the channel is determined as a sum of a transmission duration of the request frame, a transmission duration of the response frame, a transmission duration of the data frame, and N inter-frame space durations of predetermined type, where the N is a positive integer no smaller than 2.

According to a second aspect of embodiments of the present disclosure, there is provided a data transmission method performed by a response end, including:
  receiving a request frame for establishing a retransmission feedback mechanism;
  sending, based on the request frame, a response frame for establishing the retransmission feedback, where the response frame includes first configuration information for performing retransmission feedback.

In an embodiment, the first configuration information includes at least one of: feedback manner information of the retransmission feedback, where the feedback manner information is used to indicate reception feedback based on data frame or reception feedback based on data block; resource information of the retransmission feedback, where the resource information includes at least one of time information and frequency band information; and trigger frame information for triggering the retransmission feedback, where the trigger frame information at least includes at least one of transmission manner and transmission time information of a trigger frame.

In an embodiment, the method further includes sending the retransmission feedback according to the first configuration information.

In an embodiment, sending the retransmission feedback according to the first configuration information includes:

sending the retransmission feedback at a time and/or frequency indicated by the resource information.

In an embodiment, sending the retransmission feedback at the time and/or frequency indicated by the resource information includes: sending the retransmission feedback after receiving a first beacon frame subsequent to the data frame.

In an embodiment, sending the retransmission feedback after receiving the first beacon frame subsequent to the data frame includes: after receiving the first beacon frame subsequent to the data frame, sending the retransmission feedback based on the trigger frame.

In an embodiment, sending the retransmission feedback according to the first configuration information includes: when a data frame requested by the request frame is a single data frame, sending the retransmission feedback including an indicated reception feedback based on data frame, or when a data frame requested by the request frame is a continuous data frame, sending the retransmission feedback including an indicated reception feedback based on data block.

In an embodiment, the request frame includes second configuration information for requesting data frame transmission,
where the second configuration information includes at least one of: first type information of a data frame, where the first type information is used to indicate that the data frame is a single data frame or a continuous data frame; one or more pieces of first frequency band information of the data frame; and first beam information of the data frame,
where when the first type information indicates a continuous data frame, the second configuration information further includes first quantity information of sub-data frames included in the continuous data frame, where the response frame further includes third configuration information generated based on the second configuration information.

In an embodiment, determining the third configuration information based on the second configuration information includes at least one of: according to the first type information of the data frame requested by the request frame, determining second type information of the data frame included in the third configuration information; according to the first frequency band information of the data frame requested by the request frame, determining second frequency band information of the data frame included in the third configuration information; and according to the first beam information of the data frame requested by the request frame, determining second beam information of the data frame included in the third configuration information.

In an embodiment, the response frame further includes a second duration information bit used to indicate a duration in which a response end occupies a channel; the duration in which the response end occupies the channel is determined as a sum of a transmission duration of the response frame, a transmission duration of the data frame, and M inter-frame space durations of predetermined type, where the M is a positive integer.

According to a third aspect of embodiments of the present disclosure, there is provided a data transmission method performed by a communication device, the communication device is neither a request end for sending a data frame nor a response end for receiving a data frame, the method includes:
receiving a request frame from the request end and a response frame from the response end;
determining a first communication duration in which the request end occupies a channel according to a first duration information bit in the request frame, and determining a second communication duration in which the response end occupies a channel according to a second duration information bit in the response frame;
not occupying the channel within communication duration determined based on the first communication duration and the second communication duration;
where the communication duration is a sum of a transmission duration of the request frame, a transmission duration of the response frame, a transmission duration of a data frame, and N inter-frame space durations of predetermined type, where the N is a positive integer no smaller than 2.

In the data transmission methods and apparatuses according to the embodiments of the present disclosure, a request frame for establishing a retransmission feedback mechanism is generated and sent; a response frame returned based on the request frame and for establishing the retransmission feedback is received, wherein the response frame includes first configuration information for performing retransmission feedback. In this way, a retransmission feedback connection may be established between a request end and a response end through the request frame and the response frame. In this case, on one hand, the response frame provides configuration information of retransmission feedback to indicate the request end to process retransmission feedback so as to increase the efficiency for the request end processing the retransmission feedback; on the other hand, by establishing the retransmission feedback connection, retransmission basis can be provided for subsequent data retransmission, thus improving error correction capability of data transmission.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
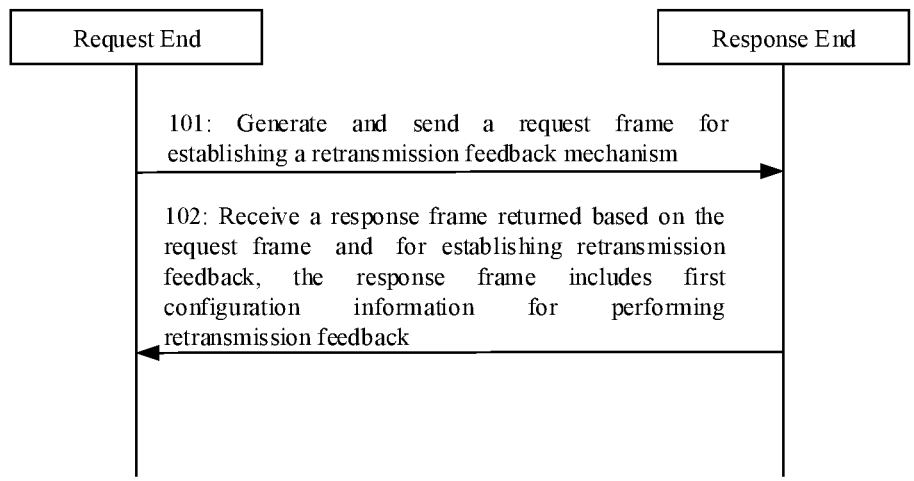
FIG. 1 is a flowchart illustrating a data transmission method according to an exemplary embodiment of the present disclosure.

Exemplary embodiments are described in detail herein, with the illustrations thereof represented in the drawings. When the following descriptions involve the drawings, like numerals in different drawings refer to same or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

The terms used in embodiments of the present disclosure are for the purpose of describing particular embodiments only, and are not intended to limit embodiments of the present disclosure. Terms determined by "a", "the" and "said" in their singular forms in embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first", "second", "third", and the like may be used in embodiments of the present disclosure to describe various information, such information should not be limited to these terms. These terms are only used to distinguish one category of information from another. For example, without departing from the scope of the present disclosure, first information may be referred as second information; and similarly, the second information may also be referred as the first information.

Depending on the context, the term "if" as used herein may be interpreted as "when" or "upon" or "in response to determining".

The execution subjects involved in the embodiments of the present disclosure include but not limited to a network device under wireless communication network, especially, Wi-Fi network, for example, IEEE802.11a/b/g/n/ac standard, and a network device under 802.11be standard in a next generation Wi-Fi network. The network device includes but not limited to wireless access point device such as a Wi-Fi router, a wireless station (STA), a user terminal, a user node, a mobile terminal or a tablet computer or the like.

In an application scenario of the embodiments of the present disclosure, at present, no mechanism for performing data transmission and feedback based on HARQ technology has been established in a Wi-Fi technology.

As shown in FIG. 1, an exemplary embodiment of the present disclosure provides a data transmission method, which may be applied to a data frame sender of wireless communication, i.e. a request end. The method includes the following steps.

At step 101, a request frame for establishing a retransmission feedback mechanism is generated and sent.

At step 102, a response frame returned based on the request frame and for establishing retransmission feedback is received, the response frame includes first configuration information for performing retransmission feedback. The retransmission feedback mechanism includes a feedback mechanism based on Hybrid Automatic Repeat reQuest (HARQ). The request frame may be used to initiate a data transmission complying with the requirements of the HARQ transmission mechanism in a Wi-Fi communication.

The request frame may be sent by an end sending a data frame in the Wi-Fi communication, i.e. a request end. An end receiving the data frame, i.e. a response end, may receive the request frame and return a response frame based on the request frame. The request end and the response end may be Wi-Fi communication devices, for example, wireless STAs or wireless APs or the like. The request frame may be sent and received between the request end and the response end based on an existing Wi-Fi protocol and subsequent development thereof The request frame may be used to instruct the response end to perform data transmission with the request end through the HARQ transmission mechanism. The response end may determine to perform data transmission with the request end through the HARQ transmission mechanism according to a format or an identifier bit or the like of the request frame.

Figure 2:
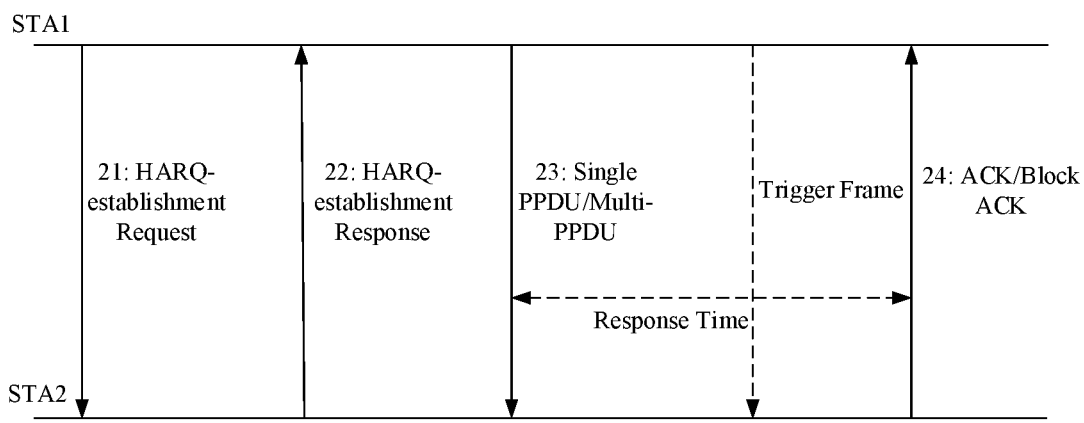
FIG. 2 is a schematic diagram illustrating a data interaction according to an exemplary embodiment of the present disclosure.

FIG. 2 is a schematic diagram illustrating an interaction of a request end and a response end, where the request end is a wireless station STA1 and the response end is a wireless station STA2. As shown in FIG. 2, the request end firstly sends a request frame; the response end receives the request frame and then sends a response frame to the request end based on the request frame.

The first configuration information may be used to indicate information such as a transmission resource and a format of retransmission feedback. The retransmission feedback may be ACK/NACK information and a bitmap or the like form may be adopted to feed back the reception of data frame.

The steps for performing retransmission feedback based on HARQ transmission mechanism may include the following steps as shown in FIG. 2.

At step 21, a request end sends a request frame. At step 22, a response end returns a response frame based on content of the request frame.

At step 23, the request end sends a data frame. At step 24, the response end sends retransmission feedback based on the reception of the data frame.

After receiving the retransmission feedback, the request end may retransmit a data frame which is determined as unsuccessfully received based on the retransmission feedback; and the response end performs analysis or combination analysis with the retransmitted data frame. A retransmission feedback connection may be established between the request end and the response end through the request frame and the response frame. The response frame provides configuration information of retransmission feedback to indicate the request end to process the retransmission feedback, thus improving the efficiency for the request end processing retransmission feedback. Additionally, by establishing the retransmission feedback connection, retransmission basis can be provided for subsequent data retransmission, thus improving the error correction capability of data transmission.

In an embodiment, the first configuration information includes at least one of: feedback manner information of retransmission feedback, where the feedback manner information is used to indicate reception feedback based on data frame and/or data block; resource information of retransmission feedback, where the resource information includes time information and/or frequency band information; trigger frame information for triggering retransmission feedback, where the trigger frame information at least includes transmission manner and/or transmission time information of trigger frame.

The feedback manner information of retransmission feedback may be used to indicate a feedback form of the retransmission feedback to the request end. The reception feedback based on data frame may be a feedback for one individual data frame, for example, a feedback for a single data frame. The reception feedback based on data block may be a feedback for several sub-data frames included in a continuous data frame and indicate, in a bitmap or the like form, the reception of each sub-data frame included in the continuous data frame. In the bitmap, "1" may represent that a corresponding sub-data frame is successfully received and "0" may represent that a corresponding sub-data frame is unsuccessfully received. If a data type requested for transmission in the request frame indicates a continuous data frame, the response end may adopt the reception feedback based on data block to perform retransmission feedback. With the request frame, a HARQ transmission mechanism for the continuous data frame is established and a reception feedback based on data block is realized to perform retransmission feedback for continuous data frame.

The response end may determine the feedback manner information according to the data frame type requested in the request frame. When the request frame requests transmission of a single data frame, the feedback manner information may indicate reception feedback based on data frame. When the request frame requests transmission of a continuous data frame, the feedback manner information may indicate reception feedback based on data block.

When the feedback manner information indicates reception feedback based on data frame, the request end may determine a reception of a single data frame based on the received retransmission feedback. When the feedback manner information indicates reception feedback based on data block, the request end may determine respective receptions of several sub-data frames in the continuous data frame based on the received retransmission feedback.

The resource information of retransmission feedback may be used to indicate a transmission resource of the retransmission feedback to the request end.

The time information in the resource information of retransmission feedback may indicate a time domain resource for transmitting retransmission feedback. The frequency band information in the resource information of retransmission feedback may indicate a frequency domain resource for transmitting retransmission feedback. The request end may receive the retransmission feedback from the response end on the time domain and/or frequency domain resource for transmitting retransmission feedback indicated by the resource information.

The retransmission feedback may be triggered by a trigger frame. The request end may send a trigger frame to trigger the response end to send retransmission feedback. The response end may indicate, through the response frame and to the request end, the transmission manner and/or transmission time information for sending trigger frame. The request end sends a trigger frame based on the transmission manner and/or transmission time information of trigger frame to trigger the response end to send retransmission feedback.

The first configuration information provides a transmission resource, a feedback content and a trigger manner and the like of retransmission feedback and thus the request end may trigger, receive and decode a retransmission feedback based on the indication information provided by the first configuration information, thereby improving the efficiency for the request end processing the retransmission feedback.

In an embodiment, the method further includes receiving the retransmission feedback according to the first configuration information.

After receiving the response frame, the request end sends a data frame to the response end. After receiving the data frame, the response end feeds back a reception result to the request end through the retransmission feedback. The request end may receive the retransmission feedback according to a resource indicated by the first configuration information or in a reception manner indicated by the first configuration information or the like.

In an embodiment, receiving the retransmission feedback according to the first configuration information includes: receiving the retransmission feedback at a time and/or frequency indicated by the resource information.

The time information in the resource information of retransmission feedback may be a time domain resource for transmitting retransmission feedback. The frequency band information in the resource information of retransmission feedback may be a frequency domain resource for transmitting retransmission feedback. The request end may receive the retransmission feedback from the response end on the time domain and/or frequency domain resource for transmitting retransmission feedback indicated by the resource information of retransmission feedback. In this way, the retransmission feedback may be accurately received.

In an embodiment, receiving the retransmission feedback at the time indicated by the resource information includes: receiving the retransmission feedback after sending a first beacon frame subsequent to the data frame.

The Wi-Fi communication device, such as a wireless STA or a wireless AP, may periodically send out a beacon frame for synchronization or indicating a presence of the wireless network.

The time indicated by the resource information may correspond to sending the first beacon frame subsequent to the data frame. The request end may receive the retransmission feedback after sending the first beacon frame subsequent to the data frame.

In an embodiment, receiving the retransmission feedback after sending the first beacon frame subsequent to the data frame includes: sending the trigger frame after sending the first beacon frame subsequent to the data frame; receiving the retransmission feedback triggered based on the trigger frame.

Specifically, as shown in FIG. 2, the request end may, after sending the first beacon frame subsequent to the data frame, adopt a trigger manner to trigger the response end to send retransmission feedback. The trigger manner may be sending a trigger frame to the response end. The content of the trigger frame may be negotiated in advance by the request end and the response end.

After receiving the trigger frame, the response end may send the retransmission feedback to the request end according to the transmission resource of retransmission feedback in the first configuration information.

In an embodiment, the transmission manner of trigger frame includes sending the trigger frame in a contention transmission manner or sending the trigger frame at a preset time point.

The contention transmission may refer to using a distributed control function (DCF) and sending the trigger frame when determining that a channel for transmitting trigger frame is idle. The request end may monitor the channel for sending trigger frame. When determining that a link in the channel is in an idle state, the request end may send the trigger frame after waiting for a space time during which a packet may appear.

The request end may also preset a time point and send the trigger frame at the preset time point to trigger the response end to send the retransmission feedback.

In an embodiment, the request frame includes second configuration information for requesting data frame transmission.

When the request end needs to send a data frame to the response end, before sending the data frame, the request end may send, to the response end and through the request frame, the second configuration information for requesting data frame transmission.

The second configuration information may be used to send, to the response end, information such as a resource, a type and a length of the data frame requested for transmission.

In an embodiment, the second configuration information includes at least one of: first type information of data frame, where the first type information is used to indicate the data frame as a single data frame or a continuous data frame; one or more pieces of first frequency band information of data frame; first beam information of data frame.

The first type information in the second configuration information is used to indicate a type of data frame to be sent to the response end by the request end. The response end may determine a type of receivable data frame according to its own reception capability and the like; and feed it back to the request end through second type information in the response frame. The type of data frame may include a single data frame or a continuous data frame. The second type information returned by the response end may be identical to or different from the first type information.

When the first type information in the request frame indicates a continuous data frame, the response end may adopt retransmission feedback based on data block to feedback respective receptions of sub-data frames in the continuous data frame to the request end.

Wi-Fi technology may be used to achieve data frame transmission on several frequency bands such as 2.4 GHz, 5.8 GHz and 6-7 GHz. The request end may request the first frequency band information for sending data frame from the response end through the second configuration information. The first frequency band information may include one or more frequency bands. The response end may feedback a frequency band allowed for data frame transmission according to its own frequency band compatibility and the like. The response end may indicate the frequency band allowed for data frame transmission through second frequency band information in the response frame.

Wi-Fi technology may also combine beamforming or the like technology to achieve directional data transmission and reception. The first beam information may be used to request a beam for transmitting data frame. The first beam information may indicate several beams and the response end may determine a beam for sending data frame according to the received first beam information, and indicate a beam for transmitting data frame to the request end through second beam information in the response frame.

In an embodiment, when the first type information indicates a continuous data frame, the second configuration information further includes first quantity information of sub-data frames included in the continuous data frame.

The first quantity information is used to request, from the response end, a number of sub-data frames included in a continuous data frame to be transmitted. After receiving the first quantity information, the response end may determine, according to a reception capability or a resource configuration of the response end or the like, a number of sub-data frames included in a continuous data frame that is allowed to be transmitted by the request end and send it to the request end through second quantity information in the response frame. The request end may, when sending the continuous data frame, send sub-data frames of the quantity indicated by the second quantity information.

In an embodiment, the response frame further includes third configuration information generated based on the second configuration information.

Before sending a data frame, the request end may send, through the request frame and to the response end, the second configuration information for requesting data frame transmission. The second configuration information may be used to send, to the response end, information such as a resource, a type and a length of the data frame requested for transmission.

The response end generates the third configuration information based on the second configuration information. The third configuration information is used to indicate the request end with information such as a resource, a type and a length of a data frame allowed to transmit.

In an embodiment, the third configuration information includes at least one of: second type information of data frame, where the second type information is used to indicate the data frame as a single data frame or a continuous data frame; second frequency band information of data frame; second beam information of data frame.

After receiving the second configuration information, the response end may obtain, according to the first type information, a type of a data frame to be transmitted by the request end to the response end. The response end may determine a type of a receivable data frame according to its own reception capability and the like, and feed it back to the request end through the second type information. The type of data frame may include a single data frame or a continuous data frame. The second type information returned by the response end may be identical to or different from the first type information.

When the second type information returned by the response frame indicates a continuous data frame, retransmission feedback based on data block may be adopted to feedback respective receptions of sub-data frames in the continuous data frame to the request end.

After receiving the second configuration information, the response end may obtain, according to the first frequency band information, one or more frequency bands for the request end sending data frame. The response end may feedback a frequency band allowed for data frame transmission according to its own frequency band compatibility and the like. The response end may indicate the frequency band allowed for data frame transmission through the second frequency band information.

After receiving the second configuration information, the response end may determine, according to the first beam information, a beam for data frame transmission requested by the request end. The first beam information may indicate several beams, and the response end may determine a beam for sending data frame according to the received first beam information, and return the second beam information through the response frame. The second beam information may be used to indicate the request end with a beam for data frame transmission. The first beam information and the second beam information may include identification information and the like of a beam.

In an embodiment, the method further includes sending the data frame according to the third configuration information.

The request end receives the response frame and determines, according to the third configuration information, a resource, a type and a length for data frame transmission allowed by the response end, i.e. an end receiving data frame, and send the data frame to the response end according to the allowed resource, type and length and the like for data frame transmission.

In an embodiment, sending the data frame according to the third configuration information includes: sending the data frame on a frequency band resource indicated by the second frequency band information.

The response end may feedback a frequency band allowed for data frame transmission according to its own frequency band compatibility and the like. The response end may indicate the frequency band allowed for data frame transmission through the second frequency band information.

The request end receives the response frame, determines a frequency band resource for sending data frame according to the second frequency band information in the third configuration information and sends the data frame to the response end on the frequency band resource indicated by the second frequency band information.

In an embodiment, when the second type information indicates that the data frame is a continuous data frame, the third configuration information further includes second quantity information of sub-data frames included in a continuous data frame. The second quantity information is determined according to a number of sub-data frames included in a continuous data frame that is requested in the request frame; sending the data frame according to the third configuration information includes sending sub-data frames of a quantity indicated by the second quantity information.

The first quantity information is used to request, from the response end, a number of sub-data frames included in a continuous data frame to be transmitted. After receiving the first quantity information, the response end may determine, according to a reception capability or a resource configuration of the response end or the like, the number of sub-data frames included in a continuous data frame that is allowed to be transmitted by the request end, and send it to the request end through the second quantity information in the third configuration information.

The request end receives the response frame and determines, according to the second quantity information in the third configuration information, a number of sub-data frames included in a continuous data frame that is allowed to be transmitted, and sends sub-data frames of the quantity indicated by the second quantity information to the response end.

In an embodiment, sending the data frame according to the third configuration information includes: sending the data frame with a beam indicated by the second beam information.

The request end receives the response frame, determines a beam for transmitting data frame according to the second beam information in the third configuration information, and sends a data frame to the response end with this beam. The second beam information may include identification information and the like of a beam.

In an embodiment, the configuration content of the second configuration information may be identical to or different from the configuration content of the third configuration information.

The second configuration information is used to request, from the response end, information such as a resource, a type and a length for data frame transmission. When the response end is allowed to respond the requested information such as resource, type and length for data frame transmission, the configuration content of the second configuration information is identical to the configuration content of the third configuration information. When the response end is allowed to adjust the requested information such as resource, type and length for data frame transmission according to its own situations, for example, adjust the number of sub-data frames included in a continuous data frame and the like, the configuration content of the second configuration information may be different from the configuration content of the third configuration information.

In an embodiment, the retransmission feedback includes retransmission feedback sent in delay.

Delayed retransmission feedback may be adopted to feed back the reception of data frame. After receiving the data frame, the response end may perform analysis or combination analysis for the data frame, to determine whether the data frame is successfully received. Thus, the delayed retransmission feedback rather than the quick retransmission feedback may be adopted to perform retransmission feedback.

In an embodiment, the request frame further includes a first duration information bit used to indicate a duration in which the request end occupies a channel.

A sum of a transmission duration of the request frame, a transmission duration of the response frame, a transmission duration of the data frame, and N inter-frame space durations of predetermined type is determined as the duration in which the request end occupies the channel, where the N is a positive integer no smaller than 2.

For a physical layer in the Wi-Fi technology, all transmissions are broadcast while whether a transmission is a unicast is only distinguished on and above the link layer. When a request frame is sent, the STA receiving the request frame may be notified, through the first duration information bit in the request frame, that the link will be occupied in a future period to complete the entire communication process. In this way, other STAs will not send data to interfere with the communication during this period. The time indicated by the first duration information bit may also be referred to as duration.

In an entire data transmission process based on HARQ transmission mechanism, the request end needs to send a request frame, receive a response frame and send a data frame. Therefore, a sum of a transmission duration of the request frame, a transmission duration of the response frame, a transmission duration of the data frame, and two inter-frame space durations between the request frame, the response frame and the data frame is determined as a minimum duration in which the request end occupies the channel. The minimum duration for occupying the channel may be determined as the duration, or the duration may be increased by adding one or more space durations. The inter-frame space duration of predetermined type may be a short inter-frame space duration. Because the HARQ transmission mechanism adopts the delayed retransmission feedback, the communication duration may not include the transmission duration of the retransmission feedback.

In an embodiment, the response frame further includes a second duration information bit used to indicate a duration in which a response end occupies a channel.

A sum of a transmission duration of the response frame, a transmission duration of the data frame and M inter-frame space durations of predetermined type is determined as the duration in which the response end occupies the channel, where the M is a positive integer. Because the HARQ transmission mechanism adopts the delayed retransmission feedback, the communication duration may not include the transmission duration of the retransmission feedback.

In an entire data transmission process based on HARQ transmission mechanism, the response end needs to send the response frame and receive the data frame. Therefore, a sum of a transmission duration of the response frame, a transmission duration of the data frame, and one inter-frame space duration between the response frame and the data frame is determined as a minimum duration in which the response end occupies the channel. The minimum duration for occupying the channel may be determined as the duration, or the duration may be increased by adding one or more space durations. The inter-frame space duration of predetermined type may be a short inter-frame space duration.

Figure 3:
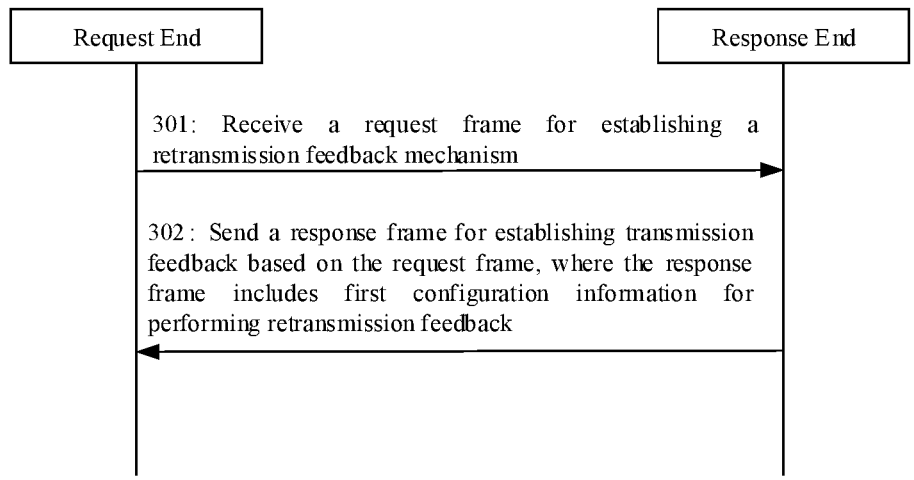
FIG. 3 is a flowchart illustrating another data transmission method according to an exemplary embodiment of the present disclosure.

As shown in FIG. 3, an exemplary embodiment of the present disclosure provides a data transmission method, which may be applied to a data frame receiver of wireless communication, i.e. a response end. The method includes the following steps.

At step 301, a request frame for establishing a retransmission feedback mechanism is received.

At step 302, a response frame for establishing transmission feedback is sent based on the request frame, where the response frame includes first configuration information for performing retransmission feedback. The retransmission feedback mechanism includes a HARQ feedback mechanism. The request frame may be used to initiate a data transmission complying with the requirements of the HARQ transmission mechanism in a Wi-Fi communication.

The request frame may be sent by an end sending a data frame in the Wi-Fi communication, i.e. a request end. An end receiving the data frame, i.e. a response end, may receive the request frame and return a response frame based on the request frame. The request end and the response end may be Wi-Fi communication devices, for example, wireless STAs or wireless APs or the like. The request frame may be sent and received between the request end and the response end based on an existing Wi-Fi protocol and subsequent development thereof The request frame may be used to instruct the response end to perform data transmission with the request end through the HARQ transmission mechanism. The response end may determine to perform data transmission with the request end through the HARQ transmission mechanism according to a format or an identifier bit or the like of the request frame.

FIG. 2 is a schematic diagram illustrating an interaction of a request end and a response end, where the request end is a wireless station STA1 and the response end is a wireless station STA2. As shown in FIG. 2, the request end firstly sends a request frame; the response end receives the request frame and then sends a response frame to the request end based on the request frame.

The first configuration information may be used to indicate information such as a transmission resource and a format of retransmission feedback. The retransmission feedback may be ACK/NACK information and a bitmap or the like form may be adopted to feed back the reception of data frame.

The steps for performing retransmission feedback based on HARQ transmission mechanism may include the following steps as shown in FIG. 2:

At step 21, a request end sends a request frame.

At step 22, a response end returns a response frame based on content of the request frame.

At step 23, the request end sends a data frame.

At step 24, the response end sends retransmission feedback based on the reception of the data frame.

After receiving the retransmission feedback, the request end may retransmit a data frame which is determined as unsuccessfully received based on the retransmission feedback; and the response end performs analysis or combination analysis with the retransmitted data frame.

A retransmission feedback connection may be established between the request end and the response end through the request frame and the response frame. On one hand, the response frame provides configuration information of retransmission feedback to indicate the request end to process retransmission feedback, thus improving the efficiency for the request end processing the retransmission feedback; on the other hand, by establishing the retransmission feedback connection, retransmission basis can be provided for subsequent data retransmission, thus improving the error correction capability of data transmission.

In an embodiment, the first configuration information includes at least one of: feedback manner information of retransmission feedback, where the feedback manner information is used to indicate reception feedback based on data frame and/or data block; resource information of retransmission feedback, where the resource information includes time information and/or frequency band information; trigger frame information for triggering retransmission feedback, where the trigger frame information at least includes transmission manner and/or transmission time information of trigger frame.

The feedback manner information of retransmission feedback may be used to indicate a feedback form of the retransmission feedback to the request end. The reception feedback based on data frame may be a feedback for one individual data frame, for example, a feedback for a single data frame. The reception feedback based on data block may be a method of feeding back respective receptions of several sub-data frames included in a continuous data frame in one retransmission feedback and indicate, in bitmap or the like form, the reception of each sub-data frame included in the continuous data frame. In the bitmap, "1" may represent that a corresponding sub-data frame is successfully received and "0" may represent that a corresponding sub-data frame is unsuccessfully received.

The response end may determine the feedback manner information according to the data frame type requested in the request frame. When the request frame requests transmission of a single data frame, the feedback manner information may indicate reception feedback based on data frame. When the request frame requests transmission of a continuous data frame, the feedback manner information may indicate reception feedback based on data block. If a data type requested for transmission in the request frame is a continuous data frame, the response end may adopt reception feedback based on data block to perform retransmission feedback. With the request frame, a HARQ transmission mechanism for the continuous data frame is established and a reception feedback based on data block is realized to perform retransmission feedback for continuous data frame.

When the feedback manner information indicates reception feedback based on data frame, the request end may determine a reception of a single data frame based on the received retransmission feedback. When the feedback manner information indicates reception feedback based on data block, the request end may determine respective receptions of several sub-data frames in the continuous data frame based on the received retransmission feedback.

The resource information of retransmission feedback may be used to indicate a transmission resource of the retransmission feedback to the request end.

The time information in the resource information of retransmission feedback may indicate a time domain resource for transmitting the retransmission feedback. The frequency band information in the resource information of retransmission feedback may indicate a frequency domain resource for transmitting retransmission feedback. The request end may receive the retransmission feedback from the response end on the time domain and/or frequency domain resource for transmitting retransmission feedback indicated by the resource information.

The retransmission feedback may be triggered by a trigger frame. The request end may send a trigger frame to trigger the response end to send retransmission feedback. The response end may indicate, through the response frame and to the request end, the transmission manner and/or transmission time information for sending trigger frame. The request end sends a trigger frame based on the transmission manner and/or transmission time information of trigger frame to trigger the response end to send retransmission feedback.

The first configuration information provides a transmission resource, a feedback content and a trigger manner and the like of retransmission feedback and thus the request end may trigger, receive and decode retransmission feedback based on the indication information provided by the first configuration information, thereby improving the efficiency for the request end processing the retransmission feedback.

In an embodiment, the method further includes sending the retransmission feedback according to the first configuration information.

After receiving the response frame, the request end sends a data frame to the response end. After receiving the data frame, the response end feeds back a reception result to the request end through the retransmission feedback.

The response end may send the retransmission feedback according to a resource indicated by the first configuration information or in a reception manner indicated by the first configuration information or the like.

In an embodiment, sending the retransmission feedback according to the first configuration information includes: sending the retransmission feedback at a time and/or frequency indicated by the resource information.

The time information in the resource information of retransmission feedback may be a time domain resource for transmitting retransmission feedback. The frequency band information in the resource information of retransmission feedback may be a frequency domain resource for transmitting retransmission feedback. The response end may send the retransmission feedback to the request end on the time domain and/or frequency domain resource for transmitting retransmission feedback indicated by the resource information of retransmission feedback. In this way, the request end may accurately receive the retransmission feedback at the time and/or frequency indicated by the resource information.

In an embodiment, sending the retransmission feedback at the time and/or frequency indicated by the resource information includes: sending the retransmission feedback after receiving a first beacon frame subsequent to the data frame.

The Wi-Fi communication device such as a wireless STA or a wireless AP may periodically send out a beacon frame for synchronization or indicating a presence of the wireless network.

The time indicated by the resource information may correspond to receiving the first beacon frame subsequent to the data frame. The response end may send the retransmission feedback after receiving the first beacon frame subsequent to the data frame.

In an embodiment, sending the retransmission feedback after receiving the first beacon frame subsequent to the data frame includes: sending the retransmission feedback based on the trigger frame after receiving the first beacon frame subsequent to the data frame.

Specifically, as shown in FIG. 2, the request end may, after sending the first beacon frame subsequent to the data frame, adopt a manner of triggering to trigger the response end to send retransmission feedback. The manner of triggering may be sending a trigger frame to the response end. The content of the trigger frame may be negotiated in advance by the request end and the response end.

After receiving the trigger frame, the response end may send the retransmission feedback to the request end according to the transmission resource of retransmission feedback in the first configuration information.

In an embodiment, sending the retransmission feedback according to the first configuration information includes: when a data frame requested by the request frame is a single data frame, sending the retransmission feedback including an indicated reception feedback based on data frame.

The response end may determine the feedback manner information according to the data frame type requested in the request frame. When the request frame requests transmission of a single data frame, the feedback manner information may indicate reception feedback based on data frame. A manner in which one ACK/NACK indicates one data frame may be adopted to perform retransmission feedback.

In an embodiment, sending the retransmission feedback according to the first configuration information includes: when the data frame requested by the request frame is a continuous data frame, sending the retransmission feedback including an indicated reception feedback based on data block.

When the request frame requests transmission of a continuous data frame, the feedback manner information may indicate reception feedback based on data block. The reception feedback based on data block may be a method of feeding back respective receptions of several sub-data frames included in a continuous data frame in one retransmission feedback and indicate, in a bitmap or the like form, the reception of each sub-data frame included in the continuous data frame. In the bitmap, "1" may represent that a corresponding sub-data frame is successfully received and "0" may represent that a corresponding sub-data frame is unsuccessfully received.

In an embodiment, the request frame includes second configuration information for requesting data frame transmission.

When the request end needs to send a data frame to the response end, before sending the data frame, the request end may send, to the response end and through the request frame, the second configuration information for requesting data frame transmission.

The second configuration information may be used to send, to the response end, information such as a resource, a type and a length of the data frame requested for transmission.

In an embodiment, the second configuration information includes at least one of: first type information of data frame, where the first type information is used to indicate the data frame as a single data frame or a continuous data frame; one or more pieces of first frequency band information of data frame; first beam information of data frame.

The first type information in the second configuration information is used to indicate a type of data frame to be sent to the response end by the request end. The response end may determine a type of receivable data frame according to its own reception capability and the like; and feed it back to the request end through the second type information in the response frame. The type of data frame may include: a single data frame or a continuous data frame. The second type information returned by the response end may be identical to or different from the first type information.

When the first type information in the request frame indicates a continuous data frame, the response end may adopt retransmission feedback based on data block to feedback respective receptions of sub-data frames in the continuous data frame to the request end.

Wi-Fi technology may be used to achieve data frame transmission on several frequency bands such as 2.4 GHz, 5.8 GHz and 6-7 GHz. The request end may request the first frequency band information for sending data frame from the response end through the second configuration information. The first frequency band information may include one or more frequency bands. The response end may feedback a frequency band allowed for data frame transmission according to its own frequency band compatibility and the like. The response end may indicate the frequency band allowed for data frame transmission through second frequency band information in the response frame.

Wi-Fi technology may also combine beamforming or the like technology to achieve directional data transmission and reception. The first beam information may be used to request a beam for transmitting data frame. The first beam information may indicate several beams and the response end may determine a beam for sending data frame according to the received first beam information, and indicate a beam for transmitting data frame to the request end through second beam information in the response frame.

In an embodiment, when the first type information indicates a continuous data frame, the second configuration information further includes first quantity information of sub-data frames included in the continuous data frame.

The first quantity information is used to request, from the response end, a number of sub-data frames included in a continuous data frame to be transmitted. After receiving the first quantity information, the response end may determine, according to a reception capability or a resource configuration of the response end or the like, a number of sub-data frames included in a continuous data frame that is allowed to be transmitted by the request end, and send it to the request end through second quantity information in the response frame. The request end may, when sending the continuous data frame, send sub-data frames of the quantity indicated by the second quantity information.

In an embodiment, the response frame further includes third configuration information generated based on the second configuration information.

Before sending a data frame, the request end may send, to the response end and through the request frame, the second configuration information for requesting data frame transmission. The second configuration information may be used to send, to the response end, information such as a resource, a type and a length of the data frame requested for transmission.

The response end generates the third configuration information based on the second configuration information. The third configuration information is used to indicate the request end with information such as a resource, a type and a length of a data frame allowed to transmit.

In an embodiment, the method further includes at least one of: determining second type information of data frame included in the third configuration information according to the first type information of data frame requested in the request frame; determining second frequency band information of data frame included in the third configuration information according to the first frequency band information of data frame requested in the request frame; determining second beam information of data frame included in the third configuration information according to the first beam information of data frame requested in the request frame.

After receiving the second configuration information, the response end may obtain, according to the first type information, a type of a data frame to be transmitted by the request end to the response end. The response end may determine a type of a receivable data frame according to its own reception capability and the like, and feed back the type of receivable data frame to the request end through the second type information. The type of data frame may include a single data frame or a continuous data frame. The second type information returned by the response end may be identical to or different from the first type information.

When the second type information returned by the response frame indicates a continuous data frame, retransmission feedback based on data block may be adopted to feed back respective receptions of sub-data frames in the continuous data frame to the request end.

After receiving the second configuration information, the response end may obtain, according to the first frequency band information, one or more frequency bands for the request end sending data frame. The response end may feed back a frequency band allowed for data frame transmission according to its own frequency band compatibility and the like. The response end may indicate the frequency band allowed for data frame transmission through the second frequency band information.

After receiving the second configuration information, the response end may determine, according to the first beam information, a beam for data frame transmission requested by the request end. The first beam information may indicate several beams, and the response end may determine a beam for sending data frame according to the received first beam information, and return the second beam information through the response frame. The second beam information may be used to indicate the request end with a beam for data frame transmission. The first beam information and the second beam information may include identification information and the like of a beam.

In an embodiment, the method further includes receiving the data frame according to the third configuration information.

The request end receives the response frame and determines, according to the third configuration information, a resource, a type and a length for data frame transmission allowed by the response end, i.e. an end receiving data frame, and send the data frame to the response end according to the allowed resource, type and length and the like for data frame transmission.

Correspondingly, the response end may receive the data frame from the request end according to the third configuration information.

In an embodiment, receiving the data frame according to the third configuration information includes: receiving the data frame on a frequency band resource indicated by the second frequency band information.

The response end may feed back a frequency band allowed for data frame transmission according to its own frequency band compatibility and the like. The response end may indicate the frequency band allowed for data frame transmission through the second frequency band information.

The request end receives the response frame, determines a frequency band resource for transmitting data frame according to the second frequency band information in the third configuration information, and sends the data frame to the response end on the frequency band resource indicated by the second frequency band information. The response end receives the data frame on the frequency band resource indicated by the second frequency band information.

In an embodiment, the method further includes: when the second type information indicates that the data frame is a continuous data frame, according to the first quantity information of sub-data frames included in a continuous data frame that is requested in the request frame, determining second quantity information of sub-data frames included in a continuous data frame, which is included in the third configuration information. Receiving the data frame according to the third configuration information includes receiving sub-data frames of the quantity indicated by the second quantity information.

The first quantity information is used to request, from the response end, a number of sub-data frames included in a continuous data frame to be transmitted. After receiving the first quantity information, the response end may determine, according to a reception capability or a resource configuration of the response end or the like, the number of sub-data frames included in a continuous data frame that is allowed to be transmitted by the request end, and send it to the request end through the second quantity information in the third configuration information.

The request end receives the response frame and determines, according to the second quantity information in the third configuration information, a number of sub-data frames included in a continuous data frame that is allowed to be transmitted, and sends sub-data frames of the quantity indicated by the second quantity information to the response end. The response end receives the sub-data frames of the quantity indicated by the second quantity information.

In an embodiment, receiving the data frame according to the third configuration information includes: receiving the data frame with a beam indicated by the second beam information.

The request end receives the response frame, determines a beam for transmitting data frame according to the second beam information in the third configuration information, and sends a data frame to the response end with this beam. The second beam information may include identification information and the like of a beam.

The response end receives the data frame on the beam indicated by the second beam information.

In an embodiment, the configuration content of the second configuration information may be identical to or different from the configuration content of the third configuration information.

The second configuration information is used to request, from the response end, information such as a resource, a type and a length for data frame transmission. When the response end is allowed to respond the requested information such as resource, type and length for data frame transmission, the configuration content of the second configuration information is identical to the configuration content of the third configuration information. When the response end is allowed to adjust the requested information such as resource, type and length for data frame transmission according to its own situations, for example, adjust the number of sub-data frames included in a continuous data frame and the like, the configuration content of the second configuration information may be different from the configuration content of the third configuration information.

In an embodiment, the retransmission feedback includes retransmission feedback sent in delay.

Delayed retransmission feedback may be adopted to feed back the reception of data frame. After receiving the data frame, the response end may perform analysis or combination analysis for the data frame, to determine whether the data frame is successfully received. Thus, the delayed retransmission feedback rather than the quick retransmission feedback may be adopted to perform retransmission feedback.

In an embodiment, the request frame further includes a first duration information bit used to indicate a duration in which a request end occupies a channel. A sum of a transmission duration of the request frame, a transmission duration of the response frame, a transmission duration of the data frame, and N inter-frame space durations of predetermined type is determined as the duration in which the request end occupies the channel, where the N is a positive integer no smaller than 2.

For a physical layer in the Wi-Fi technology, all transmissions are broadcast while whether a transmission is a unicast is only distinguished on and above the link layer. When a request frame is sent, the STA receiving the request frame may be notified, through the first duration information bit in the request frame, that the link will be occupied in a future period to complete the entire communication process.

In this way, other STAs will not send data to interfere with the communication during this period. The time indicated by the first duration information bit may also be referred to as duration.

In an entire data transmission process based on HARQ transmission mechanism, the request end needs to send a request frame, receive a response frame and send a data frame. Therefore, a sum of a transmission duration of the request frame, a transmission duration of the response frame, a transmission duration of the data frame, and two inter-frame space durations between the request frame, the response frame and the data frame is determined as a minimum duration in which the request end occupies the channel. The minimum duration for occupying the channel may be determined as the duration, or the duration may be increased by adding one or more space durations. The inter-frame space duration of predetermined type may be a short inter-frame space duration.

In an embodiment, the response frame further includes a second duration information bit used to indicate a duration in which a response end occupies a channel. A sum of a transmission duration of the response frame, a transmission duration of the data frame and M inter-frame space durations of predetermined type is determined as the duration in which the response end occupies the channel, where the M is a positive integer. Because the HARQ transmission mechanism adopts the delayed retransmission feedback, the communication duration may not include the transmission duration of the retransmission feedback.

In an entire data transmission process based on HARQ transmission mechanism, the response end needs to send the response frame and receive the data frame. Therefore, a sum of a transmission duration of the response frame, a transmission duration of the data frame, and one inter-frame space duration between the response frame and the data frame is determined as a minimum duration in which the response end occupies the channel. The minimum duration for occupying the channel may be determined as the duration, or the duration may be increased by adding one or more space durations. The inter-frame space duration of predetermined type may be a short inter-frame space duration.

Figure 4:
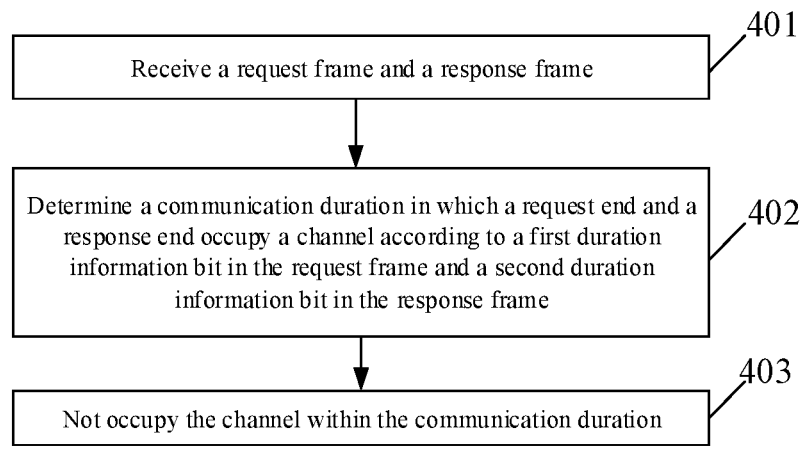
FIG. 4 is a flowchart illustrating yet another data transmission method according to an exemplary embodiment of the present disclosure.

As shown in FIG. 4, an exemplary embodiment of the present disclosure provides a data transmission method, which may be applied to a device not performing data frame transmission in wireless communication. The method includes the following steps.

At step 401, a request frame and a response frame are received.

At step 402, a communication duration in which a request end and a response end occupy a channel is determined according to a first duration information bit in the request frame and a second duration information bit in the response frame.

At step 403, the channel is not occupied within the communication duration. Where the communication duration is a sum of a transmission duration of the request frame, a transmission duration of the response frame, a transmission duration of a data frame, and N inter-frame space durations of predetermined type, the N is a positive integer no smaller than 2.

The steps of the data transmission method may be performed by a Wi-Fi device such as a STA or an AP other than both ends conducting the data frame transmission.

In a Wi-Fi communication data frame transmission, the end sending data frame, i.e. a request end sends a request frame. An end receiving data frame, i.e. a response end, may receive the request frame and return a response frame based on the request frame. After receiving the retransmission feedback, the request end may retransmit a data frame which is determined as unsuccessfully received based on the retransmission feedback; and the response end performs analysis or combination analysis with the retransmitted data frame.

For a physical layer in the Wi-Fi technology, all transmissions are broadcast while whether a transmission is a unicast is only distinguished on and above the link layer. When a request frame is sent, the STA receiving the request frame may be notified, through the first duration information bit in the request frame, that the link will be occupied in a future period to complete the entire communication process. In this way, other STAs will not send data to interfere with the communication during this period. The time indicated by the first duration information bit may also be referred to as duration.

In an entire data transmission process of HARQ transmission mechanism, the request end needs to send a request frame, receive a response frame and send a data frame. Therefore, a sum of a transmission duration of the request frame, a transmission duration of the response frame, a transmission duration of the data frame, and two inter-frame space durations between the request frame, the response frame and the data frame is determined as a minimum duration in which the request end occupies the channel. The minimum duration for occupying the channel may be determined as the duration, or the duration may be increased by adding one or more space durations. The inter-frame space duration of predetermined type may be a short inter-frame space duration. The first duration information bit may be disposed in the request frame to indicate the duration in which the request end occupies a channel.

The response end needs to send the response frame and receive the data frame. Therefore, a sum of a transmission duration of the response frame, a transmission duration of the data frame, and one inter-frame space duration between the response frame and the data frame is determined as a minimum duration in which the response end occupies the channel. The minimum duration for occupying the channel may be determined as the duration, or the duration may be increased by adding one or more space durations. The inter-frame space duration of predetermined type may be a short inter-frame space duration. The second duration information bit may be disposed in the response frame to indicate the duration in which the response end occupies the channel.

During the communication durations in which the request end and the response end occupy the channel, other Wi-Fi devices cannot occupy the channel. The communication duration in which the request end and the response end occupy the channel may be determined according to the first duration information bit in the request frame and the second duration information bit in the response frame.

A maximum value of the communication durations in which the request end and the response end occupy the channel may be selected as a duration in which other STAs do not occupy the channel. The duration in which the other STAs do not occupy the channel may be a sum of a transmission duration of the request frame, a transmission duration of response frame, a transmission duration of the data frame, and at least two inter-frame space durations of predetermined type. The inter-frame space duration of predetermined type may be a short inter-frame space duration.

In this case, it can be guaranteed that other STAs do not occupy the channel when the request end and the response end perform the entire HARQ transmission, thus improving the data transmission stability.

Because the HARQ transmission mechanism adopts the delayed retransmission feedback, the communication duration may not include the transmission duration of the retransmission feedback.

A specific example is provided below in combination with any one of the above embodiments.

1. If a STA needs to establish a HARQ mechanism to perform reception feedback of data frame before sending data, the STA sends a request frame for establishing a HARQ mechanism. The flowchart of the establishing is shown in FIG. 2.

Information included in the request frame for establishing HARQ mechanism may include: i. a single data frame or a continuous data frame (the continuous data frame may include a number of data frames sent continuously); ii. a frequency band on which the transmission is performed (2.4 GHz, 5.8 GHz and 6-7 GHz); iii. beam information to be used for data transmission.

The entire request frame for establishing HARQ mechanism implicitly identifies that ACK/Block ACK for receiving data frame is delayed ACK, and the specific reception delay is specified in a response frame for establishing HARQ mechanism.

The duration field of HARQ is set to a duration of itself plus the duration of the data frame to be sent (single data frame/continuous data frame) plus the duration of the response frame and plus a duration of 2 SIFSs.

2. Reply the response frame for establishing HARQ mechanism

The response frame includes: i. a size of data frame allowed to be sent continuously (e.g., feed back ACK as Block ACK); ii. allowed beam information and frequency band information; iii. the time information and frequency band information for receiving ACK/Block ACK, generally, ACK/Block ACK is specified as being received immediately subsequent to the first beacon frame after sending the data frame. The manner for triggering the response frame may be sending a trigger frame in a contention transmission manner or at a specified time point.

Duration field of the response frame is set to a duration of itself, plus the duration of the data frame, and plus a duration of Short Inter-Frame Space (SIFS).

3. Setting of a network allocation vector (NAV) of other STAs

The NAV is set as a sum of a duration of the request frame for establishing HARQ mechanism, a duration of the response frame for establishing HARQ mechanism, a duration of the data frame, and the duration of 2 SIFSs. In this period, the channel cannot be preemptively occupied.

I. Setting of NAV in the related arts: a sum of a duration of the request frame for establishing HARQ mechanism, a duration of response frame for establishing HARQ mechanism, a duration of the data frame, a duration of 3 SIFSs and a duration of ACK is determined as the duration of the NAV.

II. There is no ACL delayed reception mechanism in the related arts.

Figure 5:
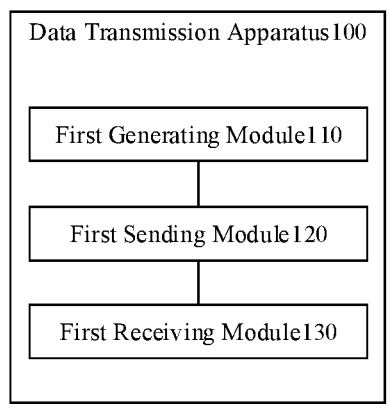
FIG. 5 is a block diagram illustrating a data transmission apparatus according to an exemplary embodiment of the present disclosure.

An embodiment of the present disclosure provides a data transmission apparatus, which is applied to a data frame sender of wireless communication, i.e. a request end. FIG. 5 is a schematic diagram illustrating a composition structure of a data transmission apparatus 100 according to an embodiment of the present disclosure. As shown in FIG. 5, the apparatus 100 includes a first generating module 110, a first sending module 120 and a first receiving module 130, where the first generating module 110 is configured to generate a request frame for establishing a retransmission feedback mechanism, The first sending module 120 is configured to send the request frame, and the first receiving module 130 is configured to receive a response frame returned based on the request frame and for establishing the retransmission feedback, where the response frame includes first configuration information for performing retransmission feedback.

In an embodiment, the first configuration information includes at least one of:
  feedback manner information of retransmission feedback, where the feedback manner information is used to indicate reception feedback based on data frame and/or data block;
  resource information of retransmission feedback, where the resource information includes time information and/or frequency band information;
  trigger frame information for triggering retransmission feedback, where the trigger frame information at least includes: transmission manner and/or transmission time information of trigger frame.

Figure 6:
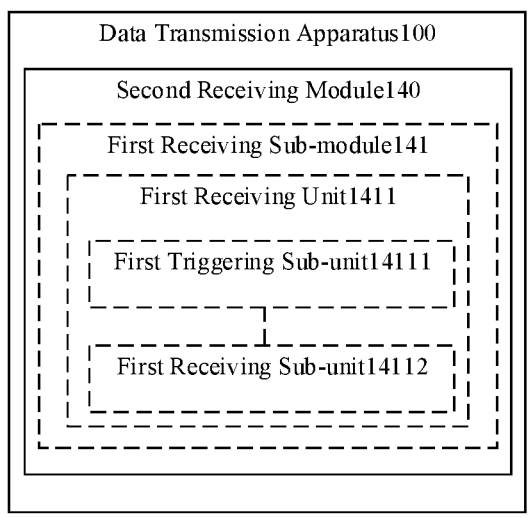
FIG. 6 is a block diagram illustrating another data transmission apparatus according to an exemplary embodiment of the present disclosure.

In an embodiment, as shown in FIG. 6, the apparatus 100 further includes:
  a second receiving module 140, configured to receive the retransmission feedback according to the first configuration information.

In an embodiment, as shown in FIG. 6, the second receiving module 140 includes:
  a first receiving sub-module 141, configured to receive the retransmission feedback at a time and/or frequency indicated by the resource information.

In an embodiment, as shown in FIG. 6, the first receiving sub-module 141 includes:
  a first receiving unit 1411, configured to, after sending a first beacon frame subsequent to the data frame, receive the retransmission feedback.

In an embodiment, as shown in FIG. 6, the first receiving unit 1411 includes:
  a first triggering sub-unit 14111, configured to, after sending the first beacon frame subsequent to the data frame, send the trigger frame;
  a first receiving sub-unit 14112, configured to receive the retransmission feedback triggered based on the trigger frame.

In an embodiment, the first triggering sub-unit 14111 is configured to send the trigger frame in a contention transmission manner or send the trigger frame at a preset time point.

In an embodiment, the request frame includes second configuration information requesting for data frame transmission.

In an embodiment, the second configuration information includes at least one of:
  first type information of data frame, which is used to indicate the data frame as a single data frame or a continuous data frame;
  one or more pieces of first frequency band information of data frame;
  first beam information of data frame.

In an embodiment, when the first type information indicates a continuous data frame, the second configuration information further includes: first quantity information of sub-data frames included in the continuous data frame.

In an embodiment, the response frame further includes third configuration information generated based on the second configuration information.

In an embodiment, the third configuration information includes at least one of:

second type information of data frame, which is used to indicate the data frame as a single data frame or a continuous data frame;
second frequency band information of data frame;
second beam information of data frame.

Figure 7:
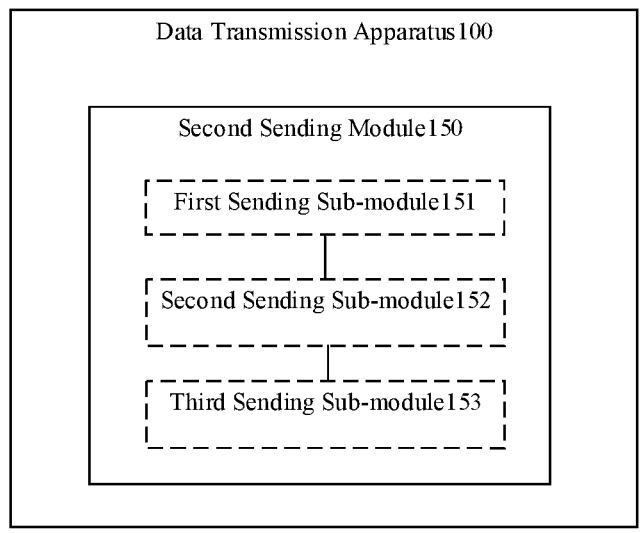
FIG. 7 is a block diagram illustrating yet another data transmission apparatus according to an exemplary embodiment of the present disclosure.

In an embodiment, as shown in FIG. 7, the apparatus 100 further includes:
a second sending module 150, configured to send the data frame according to the third configuration information.

In an embodiment, as shown in FIG. 7, the second sending module 150 includes:
a first sending sub-module 151, configured to send the data frame on a frequency band resource indicated by the second frequency band information.

In an embodiment, when the second type information indicates that the data frame is a continuous data frame, the third configuration information further includes second quantity information of sub-data frames included in a continuous data frame; the second quantity information is determined according to a number of sub-data frames included in a continuous data frame which is requested by the request frame.

As shown in FIG. 7, the second sending module 150 includes:
a second sending sub-module 152, configured to send sub-data frames of a quantity indicated by the second quantity information.

In an embodiment, as shown in FIG. 7, the second sending module 150 includes:
a third sending sub-module 153, configured to send the data frame with a beam indicated by the second beam information.

In an embodiment, a configuration content of the second configuration information may be identical to or different from a configuration content of the third configuration information.

In an embodiment, the retransmission feedback includes retransmission feedback sent in delay.

In an embodiment, the request frame further includes a first duration information bit used to indicate a duration in which the request end occupies a channel;

A sum of a transmission duration of the request frame, a transmission duration of the response frame, a transmission duration of the data frame, and N inter-frame space durations of predetermined type is determined as the duration in which the request end occupies the channel, where the N is a positive integer no smaller than 2.

In an embodiment, the response frame further includes a second duration information bit used to indicate a duration in which a response end occupies a channel. A sum of a transmission duration of the response frame, a transmission duration of the data frame, and M inter-frame space durations of predetermined type is determined as the duration in which the response end occupies the channel, where the M is a positive integer.

Figure 8:
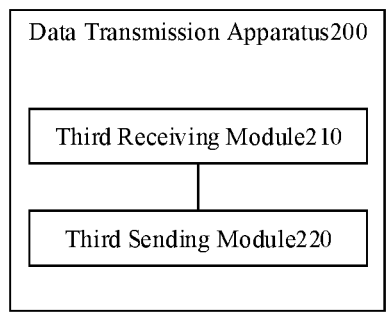
FIG. 8 is a block diagram illustrating a data transmission apparatus according to an exemplary embodiment of the present disclosure.

An embodiment of the present disclosure further provides a data transmission apparatus, which is applied to a data frame receiver of wireless communication, i.e. a response end. FIG. 8 is a schematic diagram illustrating a composition structure of a data transmission apparatus 200 according to an embodiment of the present disclosure. As shown in FIG. 8, the apparatus 200 includes a third receiving module 210 and a third sending module 220, where, the third receiving module 210 is configured to receive a request frame for establishing a retransmission feedback mechanism. The third sending module 220 is configured to send a response frame for establishing retransmission feedback based on the request frame, where the response frame includes first configuration information for performing retransmission feedback.

In an embodiment, the first configuration information includes at least one of:
feedback manner information of retransmission feedback, where the feedback manner information is used to indicate reception feedback based on data frame and/or data block;
resource information of retransmission feedback, where the resource information includes time information and/or frequency band information; and
trigger frame information for triggering retransmission feedback, where the trigger frame information at least includes: transmission manner and/or transmission time information of trigger frame.

Figure 9:
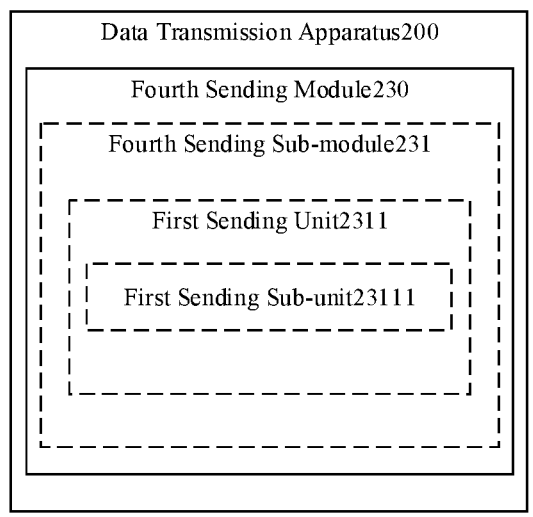
FIG. 9 is a block diagram illustrating another data transmission apparatus according to an exemplary embodiment of the present disclosure.

In an embodiment, as shown in FIG. 9, the apparatus 200 further includes a fourth sending module 230, configured to send the retransmission feedback according to the first configuration information.

In an embodiment, as shown in FIG. 9, the fourth sending module 230 includes a fourth sending sub-module 231, configured to send the retransmission feedback at a time and/or frequency indicated by the resource information.

In an embodiment, as shown in FIG. 9, the fourth sending sub-module 231 includes a first sending unit 2311, configured to send the retransmission feedback after receiving a first beacon frame subsequent to the data frame.

In an embodiment, as shown in FIG. 9, the first sending unit 2311 includes a first sending sub-unit 23111, configured to send the retransmission feedback based on the trigger frame after receiving the first beacon frame subsequent to the data frame.

Figure 10:
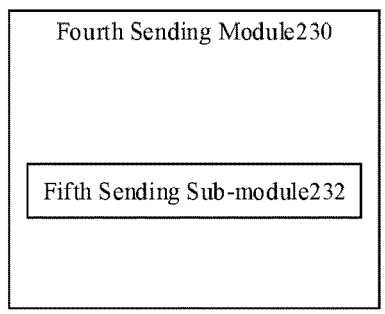
FIG. 10 is a block diagram illustrating yet another data transmission apparatus according to an exemplary embodiment of the present disclosure.

In an embodiment, as shown in FIG. 10, the fourth sending module 230 includes a fifth sending sub-module 232, configured to, when the data frame requested by the request frame is a single data frame, send the retransmission feedback including an indicated reception feedback based on data frame.

Figure 11:
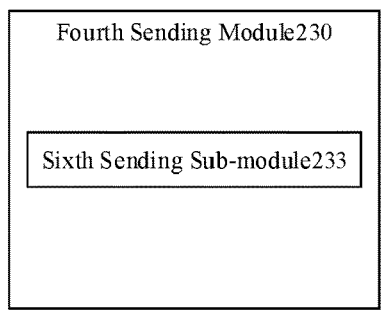
FIG. 11 is a block diagram illustrating still another data transmission apparatus according to an exemplary embodiment of the present disclosure.

In an embodiment, as shown in FIG. 11, the fourth sending module 230 includes a sixth sending sub-module 233, configured to, when the data frame requested by the request frame is a continuous data frame, send the retransmission feedback including an indicated reception feedback based on data block.

In an embodiment, the request frame includes: second configuration information for requesting data frame transmission.

In an embodiment, the second configuration information includes at least one of:
first type information of data frame, which is used to indicate the data frame as a single data frame or a continuous data frame;
one or more pieces of first frequency band information of data frame; and
first beam information of data frame.

In an embodiment, when the first type information indicates a continuous data frame, the second configuration information further includes: first quantity information of sub-data frames included in the continuous data frame.

In an embodiment, the response frame further includes: third configuration information determined based on the second configuration information.

Figure 12:
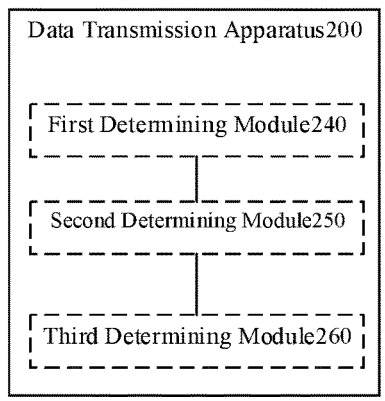
FIG. 12 is a block diagram illustrating still another data transmission apparatus according to an exemplary embodiment of the present disclosure.

In an embodiment, as shown in FIG. 12, the apparatus 200 further includes at least one of a first determining module 240, configured to, according to the first type information of data frame requested by the request frame, determine second type information of data frame included in the third configuration information, a second determining module 250, configured to, according to the first frequency band information of data frame requested by the request frame, determine second frequency band information of data frame included in the third configuration information, and a third determining module 260, configured to, according to the first beam information of data frame requested by the request frame, determine second beam information of data frame included in the third configuration information.

Figure 13:
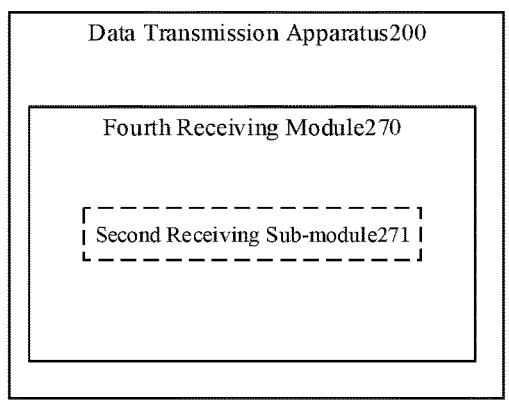
FIG. 13 is a block diagram illustrating still another data transmission apparatus according to an exemplary embodiment of the present disclosure.

In an embodiment, as shown in FIG. 13, the apparatus 200 further includes a fourth receiving module 270, configured to receive the data frame according to the third configuration information.

In an embodiment, as shown in FIG. 13, the fourth receiving module 270 includes a second receiving sub-module 271, configured to receive the data frame on a frequency band resource indicated by the second frequency band information.

Figure 14:
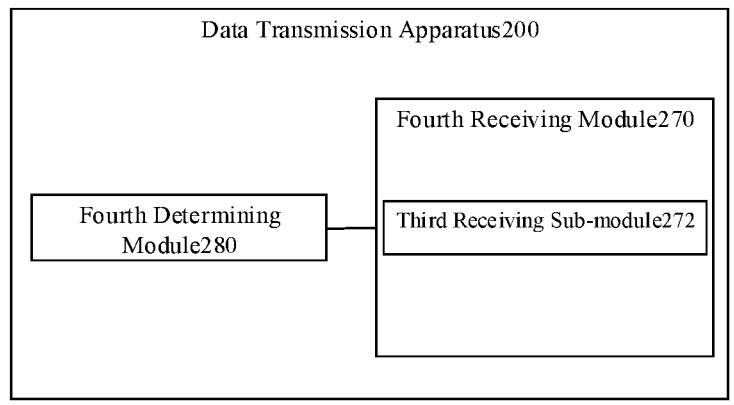
FIG. 14 is a block diagram illustrating still another data transmission apparatus according to an exemplary embodiment of the present disclosure.

In an embodiment, as shown in FIG. 14, the apparatus 200 further includes a fourth determining module 280, configured to, when the second type information indicates the data frame as a continuous data frame, determine second quantity information of sub-data frames included in a continuous data frame, which is included in the third configuration information according to the first quantity information of sub-data frames included in a continuous data frame that is requested by the request frame. The fourth receiving module 270 includes a third receiving sub-module 272, configured to receive sub-data frames of the quantity indicated by the second quantity information.

Figure 15:
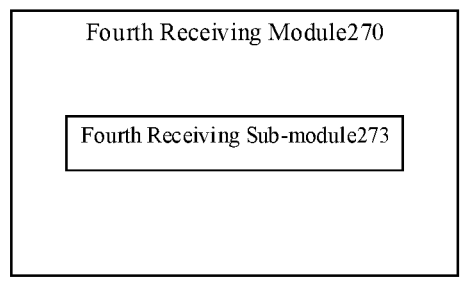
FIG. 15 is a block diagram illustrating still another data transmission apparatus according to an exemplary embodiment of the present disclosure.

In an embodiment, as shown in FIG. 15, the fourth receiving module 270 includes a fourth receiving sub-module 273, configured to receive the data frame with a beam indicated by the second beam information.

In an embodiment, a configuration content of the second configuration information may be identical to or different from a configuration content of the third configuration information.

In an embodiment, the retransmission feedback includes: transmission feedback sent in delay.

In an embodiment, the request frame further includes: a first duration information bit used to indicate a duration in which a request end occupies a channel.

A sum of a transmission duration of the request frame, a transmission duration of the response frame, a transmission duration of the data frame, and N inter-frame space durations of predetermined type is determined as the duration in which the request end occupies the channel, where the N is a positive integer no smaller than 2.

In an embodiment, the response frame further includes a second duration information bit used to indicate a duration in which a response end occupies a channel;

A sum of a transmission duration of the response frame, a transmission duration of the data frame, and M inter-frame space durations of predetermined type is determined as the duration in which the response end occupies the channel, where the M is a positive integer.

Figure 16:
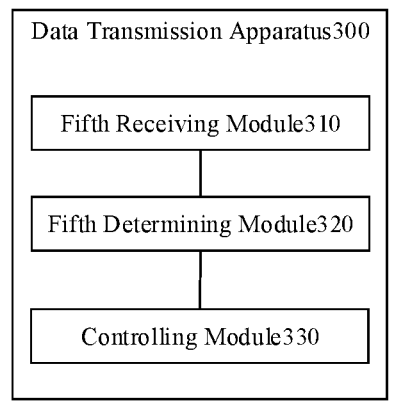
FIG. 16 is a block diagram illustrating a data transmission apparatus according to an exemplary embodiment of the present disclosure.

An embodiment of the present disclosure provides a data transmission apparatus, which may be applied to a device not performing data frame transmission in wireless communication. As shown in FIG. 16, the apparatus 300 includes a fifth receiving module 310, a fifth determining module 320 and a controlling module 330, where, the fifth receiving module 310 is configured to receive a request frame and a response frame. The fifth determining module 320 is configured to determine a communication duration in which a request end and a response end occupy a channel according to a first duration information bit in the request frame and a second duration information bit in the response frame. The controlling module 330 is configured to control a Wi-Fi device not to occupy the channel within the communication duration. The communication duration is a sum of a transmission duration of the request frame, a transmission duration of the response frame, a transmission duration of a data frame, and N inter-frame space durations of predetermined type, the N is a positive integer no smaller than 2.

In an exemplary embodiment, the first generating module 110, the first sending module 120, the first receiving module 130, the second receiving module 140, the second sending module 150, the third receiving module 210, the third sending module 220, the fourth sending module 230, the first determining module 240, the second determining module 250, the third determining module 260, the fourth receiving module 270, the fourth determining module 280, the fifth receiving module 310, the fifth determining module 320 and the controlling module 330 and the like may be implemented by one or more of Central Processing Units (CPUs), Graphics Processing Units (GPUs), baseband processors (BPs), Application Specific Integrated Circuits (ASICs), DSPs, Programmable Logic Devices (PLDs), Complex Programmable Logic Devices (CPLDs), Field-Programmable Gate Arrays (FPGAs), general processors, controllers, Micro Controller Units (MCUs), Microprocessors, or other electronic elements, so as to perform the above methods.

Figure 17:
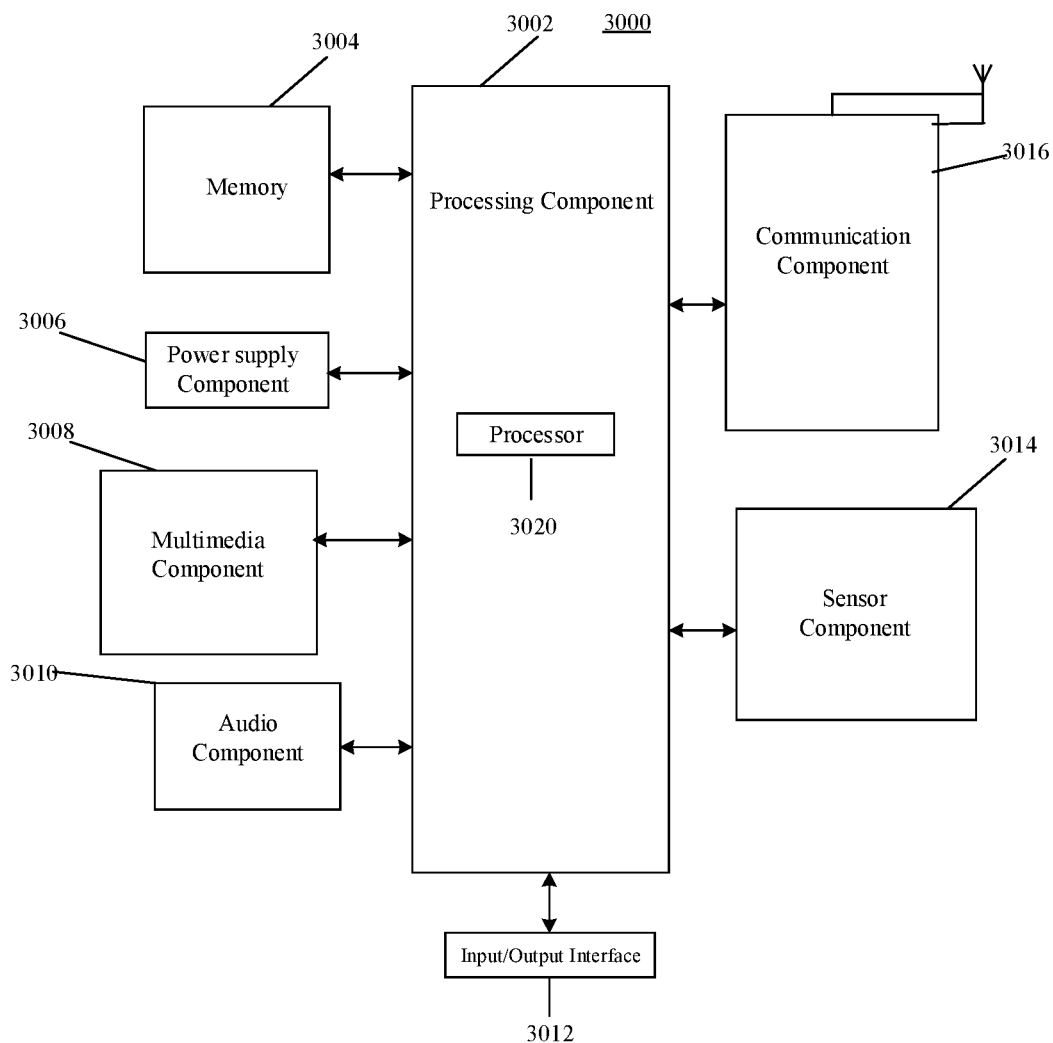
FIG. 17 is a block diagram illustrating an apparatus for data transmission according to an embodiment of the present disclosure.

FIG. 17 is a block diagram illustrating an apparatus 3000 for data transmission according to an embodiment of the present disclosure. For example, the apparatus 3000 may be a mobile phone, a computer, a digital broadcast terminal, a message transceiving device, a game console, a tablet device, a medical device, a fitness device and a personal digital assistant and the like.

As shown in FIG. 17, the apparatus 3000 may include one or more of the following components: a processing component 3002, a memory 3004, a power supply component 3006, a multimedia component 3008, an audio component 3010, an input/output (I/O) interface 3012, a sensor component 3014 and a communication component 3016.

The processing component 3002 generally controls overall operations of the apparatus 3000, such as operations associated with display, phone calls, data communications, camera operations, and recording operations. The processing component 3002 may include one or more processors 3020 to execute instructions to complete all or part of the steps of the above methods. In addition, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the apparatus 3000. Examples of such data include instructions for any application or method operated on the apparatus 3000, contact data, phonebook data, messages, pictures, videos, and so on. The memory 3004 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 3006 supplies power for different components of the apparatus 3000. The power supply component 3006 may include a power supply management system, one or more power supplies, and other components associated with generating, managing and distributing power for the apparatus 3000.

The multimedia component 3008 includes a screen that provides an output interface between the apparatus 3000 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some embodiments, the multimedia component 3008 includes a front camera and/or a rear camera. When the apparatus 3000 is in an operation mode, such as a shooting mode or a video mode, the front camera and/or the rear camera may receive external multimedia data. Each of the front and rear cameras may be a fixed optical lens system or have a focal length and an optical zoom capability.

The audio component 3010 is configured to output and/or input audio signals. For example, the audio component 3010 includes a microphone (MIC) configured to receive an external audio signal when the apparatus 3000 is in an operation mode, such as a call mode, a recording mode, and a voice recognition mode. The received audio signal may be further stored in the memory 3004 or transmitted via the communication component 3016. In some embodiments, the audio component 3010 also includes a loudspeaker for outputting an audio signal.

The I/O interface 3012 provides an interface between the processing component 3002 and a peripheral interface module which may be a keyboard, a click wheel, a button, or the like. These buttons may include, but are not limited to a home button, a volume button, a start button, and a lock button.

The sensor component 3014 includes one or more sensors for providing a status assessment in various aspects to the apparatus 3000. For example, the sensor component 3014 may detect an open/closed state of the apparatus 3000, and the relative positioning of components, for example, the component is a display and a keypad of the apparatus 3000. The sensor component 3014 may also detect a change in position of the apparatus 3000 or a component of the apparatus 3000, the presence or absence of a user in contact with the apparatus 3000, the orientation or acceleration/deceleration of the apparatus 3000 and a change in temperature of the apparatus 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an acceleration sensor, a gyro sensor, a magnetic sensor, a pressure sensor, or a temperature sensor.

The communication component 3016 is configured to facilitate wired or wireless communication between the apparatus 3000 and other devices. The apparatus 3000 may access a wireless network based on a communication standard, such as Wi-Fi, 2G or 3G, or a combination thereof. In an embodiment, the communication component 3016 receives broadcast signals or broadcast associated information from an external broadcast management system via a broadcast channel. In an embodiment, the communication component 3016 also includes a near field communication (NFC) module to facilitate short range communication. For example, the NFC module may be implemented based on a radio frequency identifier (RFID) technology, an infrared data association (IrDA) technology, an ultrawideband (UWB) technology, a Bluetooth (BT) technology, and other technologies.

In an example, the apparatus 3000 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an embodiment, there is also provided a non-transitory computer readable storage medium including computer program instructions, such as a memory 3004, where the instructions are executable by the processor 3020 of the apparatus 3000 to perform the method as described above. For example, the non-transitory computer readable storage medium may be RPM, RAM, CD-ROM, magnetic tape, floppy disk, and optical data storage device and the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A method for retransmission feedback, performed by a request end, comprising:
  generating a request frame for establishing a retransmission feedback mechanism;
  sending the request frame;
  receiving a response frame returned based on the request frame and for establishing the retransmission feedback, wherein the response frame comprises first configuration information for performing retransmission feedback,
  wherein the request frame comprises second configuration information for requesting data frame transmission,
  wherein the response frame further comprises third configuration information generated based on the second configuration information,
  wherein the third configuration information comprises at least one of:
    second type information of the data frame, wherein the second type information is used to indicate the data frame is a single data frame or a continuous data frame,
    second frequency band information of the data frame, or
    second beam information of the data frame; and sending the data frame according to the third configuration information,
wherein when the second type information indicates that the data frame is a continuous data frame, the third configuration information further comprises second quantity information of sub-data frames included in the continuous data frame; the second quantity information is determined according to a number of sub-data frames included in the continuous data frame which is requested by the request frame, and
wherein sending the data frame according to the third configuration information comprises:
sending sub-data frames of a quantity indicated by the second quantity information.

2. The method of claim 1, wherein the first configuration information comprises at least one of:
feedback manner information of the retransmission feedback, wherein the feedback manner information is used to indicate reception feedback based on data frame or reception feedback based on data block;
resource information of the retransmission feedback, wherein the resource information comprises at least one of time information and frequency band information; or
trigger frame information for triggering the retransmission feedback, wherein the trigger frame information at least comprises at least one of transmission manner and transmission time information of a trigger frame.

3. The method of claim 1, wherein the second configuration information comprises at least one of:
first type information of a data frame, wherein the first type information is used to indicate that the data frame is a single data frame or a continuous data frame;
one or more pieces of first frequency band information of the data frame; or
first beam information of the data frame, and
wherein when the first type information indicates a continuous data frame, the second configuration information further comprises first quantity information of sub-data frames included in the continuous data frame.

4. The method of claim 1, wherein sending the data frame according to the third configuration information comprises:
sending the data frame on a frequency band resource indicated by the second frequency band information.

5. The method of claim 1, wherein sending the data frame according to the third configuration information comprises:
sending the data frame with a beam indicated by the second beam information.

6. The method of claim 1, wherein
the request frame further comprises a first duration information bit used to indicate a duration in which the request end occupies a channel; and
the duration in which the request end occupies the channel is determined as a sum of a transmission duration of the request frame, a transmission duration of the response frame, a transmission duration of the data frame, and N inter-frame space durations of predetermined type, wherein the N is a positive integer no smaller than 2.

7. A method for retransmission feedback, performed by a response end, comprising:
receiving a request frame for establishing a retransmission feedback mechanism;
sending, based on the request frame, a response frame for establishing the retransmission feedback, wherein the response frame comprises first configuration information for performing retransmission feedback,
wherein the request frame comprises second configuration information for requesting data frame transmission,
wherein the response frame further comprises third configuration information generated based on the second configuration information,
wherein determining the third configuration information based on the second configuration information comprises at least one of:
according to first type information of a data frame requested by the request frame, determining second type information of the data frame comprised in the third configuration information,
according to first frequency band information of the data frame requested by the request frame, determining second frequency band information of the data frame comprised in the third configuration information, or
according to first beam information of the data frame requested by the request frame, determining second beam information of the data frame comprised in the third configuration information;
receiving the data frame according to the third configuration information; and
when the second type information indicates that the data frame is a continuous data frame, determining, according to the first quantity information of sub-data frames included in the continuous data frame which is requested by the request frame, second quantity information of sub-data frames included in the continuous data frame which is comprised by the third configuration information, and
wherein receiving the data frame according to the third configuration information comprises:
receiving sub-data frames of a quantity indicated by the second quantity information.

8. The method of claim 7, wherein the first configuration information comprises at least one of:
feedback manner information of the retransmission feedback, wherein the feedback manner information is used to indicate reception feedback based on data frame or reception feedback based on data block;
resource information of the retransmission feedback, wherein the resource information comprises at least one of time information and frequency band information; or
trigger frame information for triggering the retransmission feedback, wherein the trigger frame information at least comprises at least one of transmission manner and transmission time information of a trigger frame.

9. The method of claim 8, further comprising:
sending the retransmission feedback according to the first configuration information.

10. The method of claim 9, wherein sending the retransmission feedback according to the first configuration information comprises:
sending the retransmission feedback at a time, at a frequency, or at a time and a frequency indicated by the resource information.

11. The method of claim 10, wherein sending the retransmission feedback at the time, at the frequency, or at the time and the frequency indicated by the resource information comprises:
sending the retransmission feedback after receiving a first beacon frame subsequent to the data frame.

12. The method of claim 11, wherein sending the retransmission feedback after receiving the first beacon frame subsequent to the data frame comprises:

after receiving the first beacon frame subsequent to the data frame, sending the retransmission feedback based on the trigger frame.

13. The method of claim 9, wherein sending the retransmission feedback according to the first configuration information comprises:
when a data frame requested by the request frame is a single data frame, sending the retransmission feedback comprising an indicated reception feedback based on data frame, or
when a data frame requested by the request frame is a continuous data frame, sending the retransmission feedback comprising an indicated reception feedback based on data block.

14. The method of claim 7,
wherein the second configuration information comprises at least one of:
the first type information of the data frame, wherein the first type information is used to indicate that the data frame is a single data frame or a continuous data frame;
one or more pieces of the first frequency band information of the data frame; or
the first beam information of the data frame,
wherein when the first type information indicates a continuous data frame, the second configuration information further comprises first quantity information of sub-data frames included in the continuous data frame.

15. The method of claim 7, wherein
the response frame further comprises a second duration information bit used to indicate a duration in which a response end occupies a channel; and
the duration in which the response end occupies the channel is determined as a sum of a transmission duration of the response frame, a transmission duration of the data frame, and M inter-frame space durations of predetermined type, wherein the M is a positive integer.

* * * * *

UNITED STATES PATENT AND TRADEMARK OFFICE
CERTIFICATE OF CORRECTION

Page 1 of 1

PATENT NO. : 12,294,459 B2
APPLICATION NO. : 17/588889
DATED : May 6, 2025
INVENTOR(S) : Xiandong Dong It is certified that error appears in the above-identified patent and that said Letters Patent is hereby corrected as shown below:

In the Specification
In Column 6, Line 44, delete "thereof" and insert -- thereof. --, therefor.
In Column 14, Line 7, delete "thereof" and insert -- thereof. --, therefor.
In Column 23, Line 29, delete "mechanism" and insert -- mechanism. --, therefor.
In Column 23, Line 44, delete "STAs" and insert -- STAs. --, therefor.
In Column 23, Line 67, delete "mechanism," and insert -- mechanism. --, therefor.
In Column 25, Line 41, delete "channel;" and insert -- channel. --, therefor.
In Column 27, Line 53, delete "channel;" and insert -- channel. --, therefor.

Signed and Sealed this
Eighth Day of July, 2025

Coke Morgan Stewart
*Acting Director of the United States Patent and Trademark Office*